United States Patent
Yamakage

[11] Patent Number: 6,164,354
[45] Date of Patent: Dec. 26, 2000

[54] PNEUMATIC TIRE

[75] Inventor: Atsushi Yamakage, Akashi, Japan

[73] Assignee: Sumitomo Rubber Industries, Ltd., Kobe, Japan

[21] Appl. No.: 09/191,381

[22] Filed: Nov. 13, 1998

[30] Foreign Application Priority Data

Nov. 18, 1997 [JP] Japan ................................ 9-317183

[51] Int. Cl.$^7$ ............................ B29C 11/03; B29C 115/00
[52] U.S. Cl. .................................. 152/209.18; 152/209.28
[58] Field of Search ........................ 152/209.18, 209.28, 152/403

[56] References Cited

U.S. PATENT DOCUMENTS

| | | | |
|---|---|---|---|
| 4,057,089 | 11/1977 | Johannsen | 152/209.28 |
| 4,726,407 | 2/1988 | Hayakawa et al. | 152/209.28 |
| 5,154,783 | 10/1992 | Kuhr et al. | 152/209.28 |
| 5,423,364 | 6/1995 | Himuro | 152/209.28 |
| 5,609,699 | 3/1997 | Himuro | 152/209.28 |
| 5,759,313 | 6/1998 | Shirai et al. | 152/209.28 |
| 5,885,384 | 3/1999 | Himuro . | |
| 5,954,107 | 9/1999 | Kuze et al. | 152/209.28 |
| 5,964,266 | 10/1999 | Boiocchi et al. | 152/903 |

FOREIGN PATENT DOCUMENTS

| | | |
|---|---|---|
| 056270 | 10/1993 | European Pat. Off. . |
| 0705718 | 10/1996 | European Pat. Off. . |

OTHER PUBLICATIONS

Patent Abstracts of Japan, 04050006, Feb. 19, 1992, Kuramochi Izumi.
Patent Abstracts of Japan, 04043105, Feb. 13, 1992, Himuro Yasuo.
Patent Anstract of Japan, 04193608, Jul. 13, 1992, Himuro Yasuo.

*Primary Examiner*—Steven D. Maki
*Attorney, Agent, or Firm*—Birch, Stewart, Kolasch & Birch LLP

[57] ABSTRACT

A pneumatic tire comprises a circumferential groove disposed in the axial center of the tread potion, circumferentially spaced main grooves disposed on both sides of the tire equator, the main grooves extending axially outwardly beyond the tread edges, while inclining to one circumferential direction and increasing the inclination angle of the groove center line with respect to the circumferential direction, auxiliary grooves each disposed between the circumferentially adjacent main grooves and extending from a middle portion of one of the main grooves towards the above-mentioned circumferential direction beyond the tread edge, each of the auxiliary groove having a part being equidistant from the adjacent main grooves and having a length more than 30% of the length of the auxiliary groove. The intersecting angle $\beta$ of the auxiliary grooves with the main grooves is in the range of from 20 to 60 degrees.

14 Claims, 5 Drawing Sheets

PNEUMATIC TIRE

The present invention relates to a pneumatic tire, particularly to a directional tread pattern capable of improving the steering stability, wet performance and tire noise.

In conventional pneumatic tires for passenger cars and the like, the tread portion is provided with relatively wide circumferential grooves which extend continuously in the tire circumferential direction to prevent aquaplaning. However, such a circumferential groove generates a noise during running due to its columnar resonance whose primary mode frequency ranges from 800 to 1.2 kHz. It has been known to be effective for reducing the resonance noise to decrease the groove width, but this decreases the groove volume and as a result an aquaplaning phenomenon becomes liable to occur. If a number of relatively narrow circumferential grooves are disposed in the tread, the drainage may be improved, but the steering stability is liable to deteriorate because it is difficult to maintain a necessary tread rigidity. These problems are especially remarkable in low-aspect-ratio high performance tires.

It is therefore, an object of the present invention to provide a pneumatic tire in which the steering stability, wet performance and tire noise are effectively improved at the same time.

According to one aspect of the present invention a pneumatic tire comprises a tread portion defining a tread having axial edges, a circumferential groove disposed in the tread center., circumferentially spaced main grooves disposed on both sides of the tire equator, the main grooves extending axially outwardly beyond the tread edges, while inclining to one circumferential direction and increasing the inclination angle of the groove center line with respect to the circumferential direction such that the inclination angle al at the axially inner end of the groove is 0 to 15 degrees, and the inclination angle $\alpha 2$ at the tread edge is 60 to 90 degrees, auxiliary grooves each disposed between the circumferentially adjacent main grooves and extending from a middle portion of one of the main grooves towards the above-mentioned one circumferential direction beyond the tread edge.

Preferably, the junction of each of the auxiliary grooves with the main groove is spaced apart 20 to 60% of the axial distance SL between one of the tread edges and the center line of the circumferential groove from the center line. The intersecting angle $\beta$ of the auxiliary grooves with the main grooves is in the range of from 20 to 60 degrees. The auxiliary grooves extend axially outwardly, while increasing the inclination angle of the groove center line with respect to the circumferential direction.

An embodiment of the present invention will now be described in detail in conjunction with the accompanying drawings.

Figure 1:
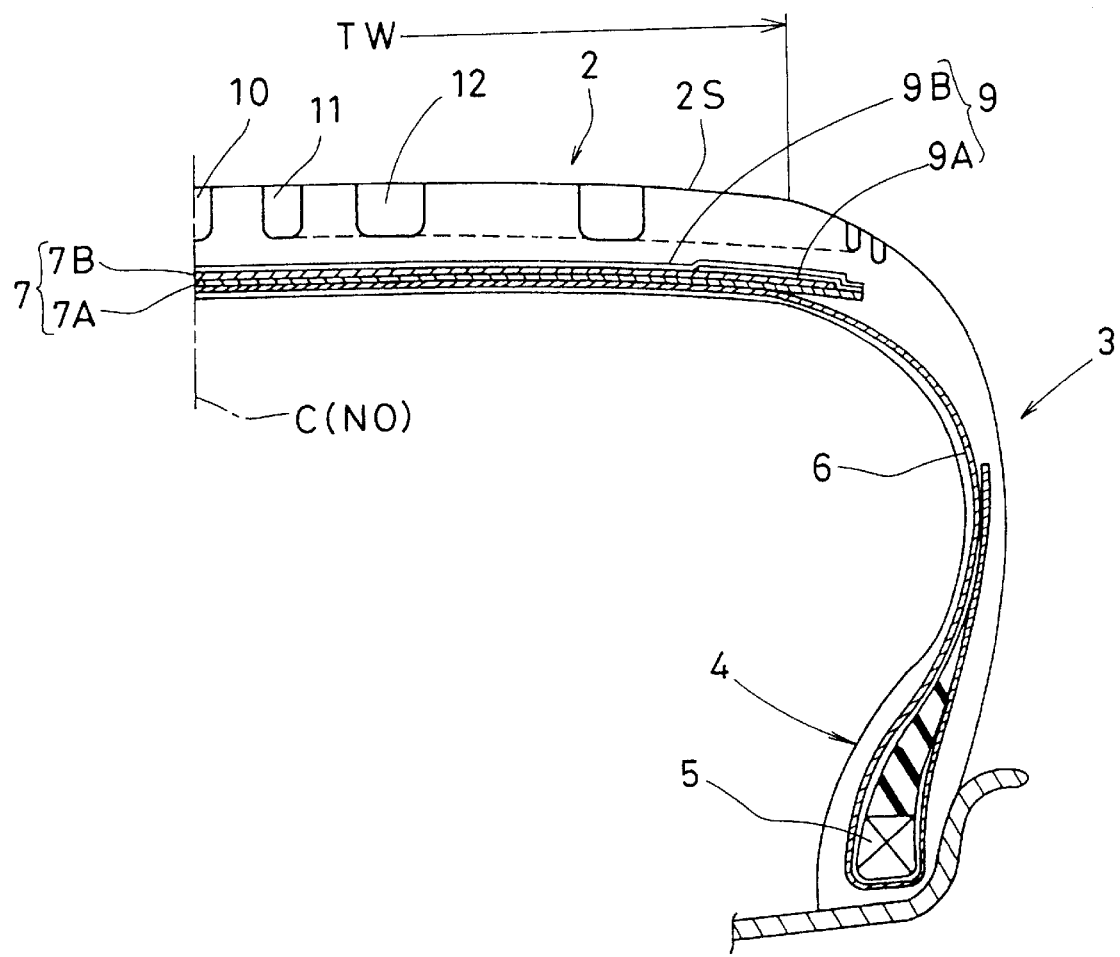
FIG. 1 is a cross sectional view of an embodiment of the present invention.

In FIG. 1, the pneumatic tire 1 according to the invention is a 235/45ZR17 radial tire for passenger cars. The tire 1 comprises a tread portion 2, a pair of axially spaced bead portions 4 with a bead core 5 therein, a pair of sidewall portions 3, a carcass 6 extending between the bead portions 4, and belts 7 and 9 disposed radially outside the carcass 6 in the tread portion 2.

The carcass 6 comprises at least one ply of organic fiber cords arranged radially at an angle of from 70 to 90 degrees with respect to the tire equator C. In this embodiment, the carcass is composed of a single ply of polyester cords arranged at 90 degrees.

The belt 7 comprises at least two cross plies of high modulus cords such as steel and the like laid at angles of 10 to 30 degrees with respect to the tire equator C. In this embodiment, the belt is composed of a radially inner ply 7A and a radially outer ply 7B, each made of parallel cords laid at 24 degrees.

The band 9 is disposed radially outside the belt to cover the edges of the belt at least and comprises at least one cord ply of which cord angle is less than 5 degrees with respect to the tire equator C. In this embodiment, the band is composed of a pair of axially spaced edge plies 9A disposed on the axial edge parts of the belt and an axially outer full-width ply 9B extending over the belt 7, each ply made of at least one spirally-wound organic fiber cord such as nylon and the like.

The tread portion 2 is provided near or on the tire equator C with at least one circumferential groove 10 extending continuously in the circumferential direction. Further, on each side of the tire equator, main grooves 11 and auxiliary grooves 12 are disposed. The above-mentioned term 'near the tire equator' means 'inside of a tread center region Yc' extending from the tire equator C toward both sides thereof by a distance of 0.1 times the tread width TW, and also it means that the center line N0 of the circumferential groove 10 is disposed within the region Yc. Here, the tread width TW is the axial width between the axial outmost edges Te of the ground contacting area under such a condition that the tire is mounted on its standard rim and inflated to its standard pressure, and then loaded with a standard load. The standard rim is a rim officially approved for the tire by standard organization, for example JATMA (Japan), TRA (USA), ETRTO (Europe) and the like, and the standard inner pressure and the standard load are the maximum air pressure and the maximum tire load for the tire officially specified in Air-pressure/Maximum-load Table. Further, a tread length TL is defined as the maximum circumferential length of the ground contacting area.

In this embodiment, only one circumferential groove 10 is disposed in the tread, which is a straight groove whose center line N0 is just on the tire equator C. However, a zigzag groove may be used instead. In this case, the amplitude of the zigzag is preferably smaller than the groove width and the groove center line is disposed within the region Yc. The circumferential groove 10 has a U-shaped cross sectional shape so that edged corners are formed between the groove sidewalls and tread face.

Figure 2:
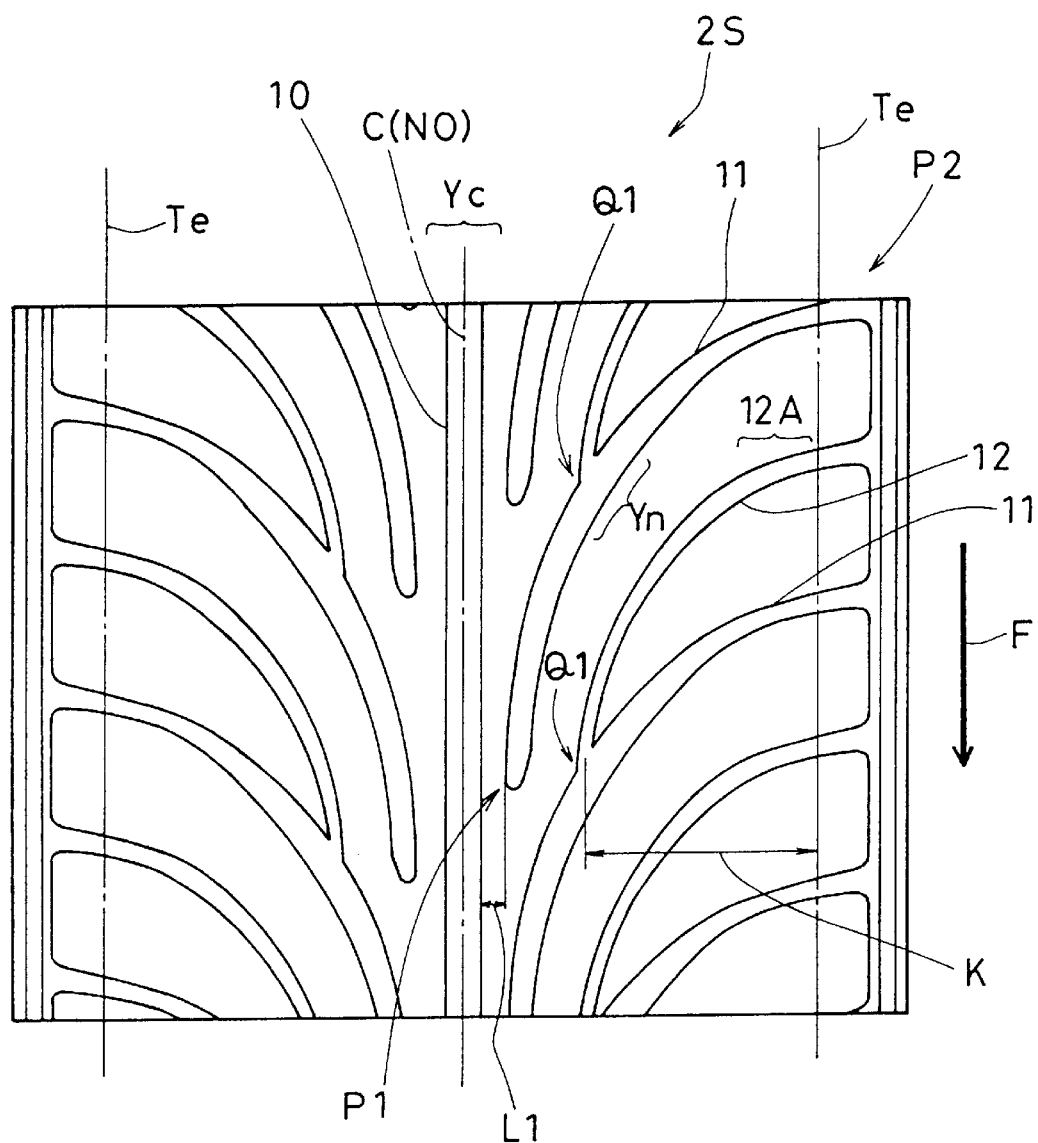
FIG. 2 is a developed partial plan view thereof showing an example of the tread pattern.

As shown in FIG. 2, the main grooves 11 extend axially outwardly from the tread center beyond the tread edge Te, and all the main grooves 11 incline towards the same direction, which is reverse to the designed rolling direction F of the tire, so as to form a directional tread pattern.

The main grooves each have an axially inner end spaced apart from the circumferential groove 10, and the minimum axial distance L1 therebetween is in the range of from 5 to 30 mm, preferably 10 to 20 mm. If the distance L1 is more than 30 mm, drainage from the tread center is insufficient and aquaplaning is liable to occur. If distance L1 less than 5 mm, the rigidity of the tread rubber near the circumferential groove 10 becomes excessively low, and the straight running stability deteriorates.

Figure 3:
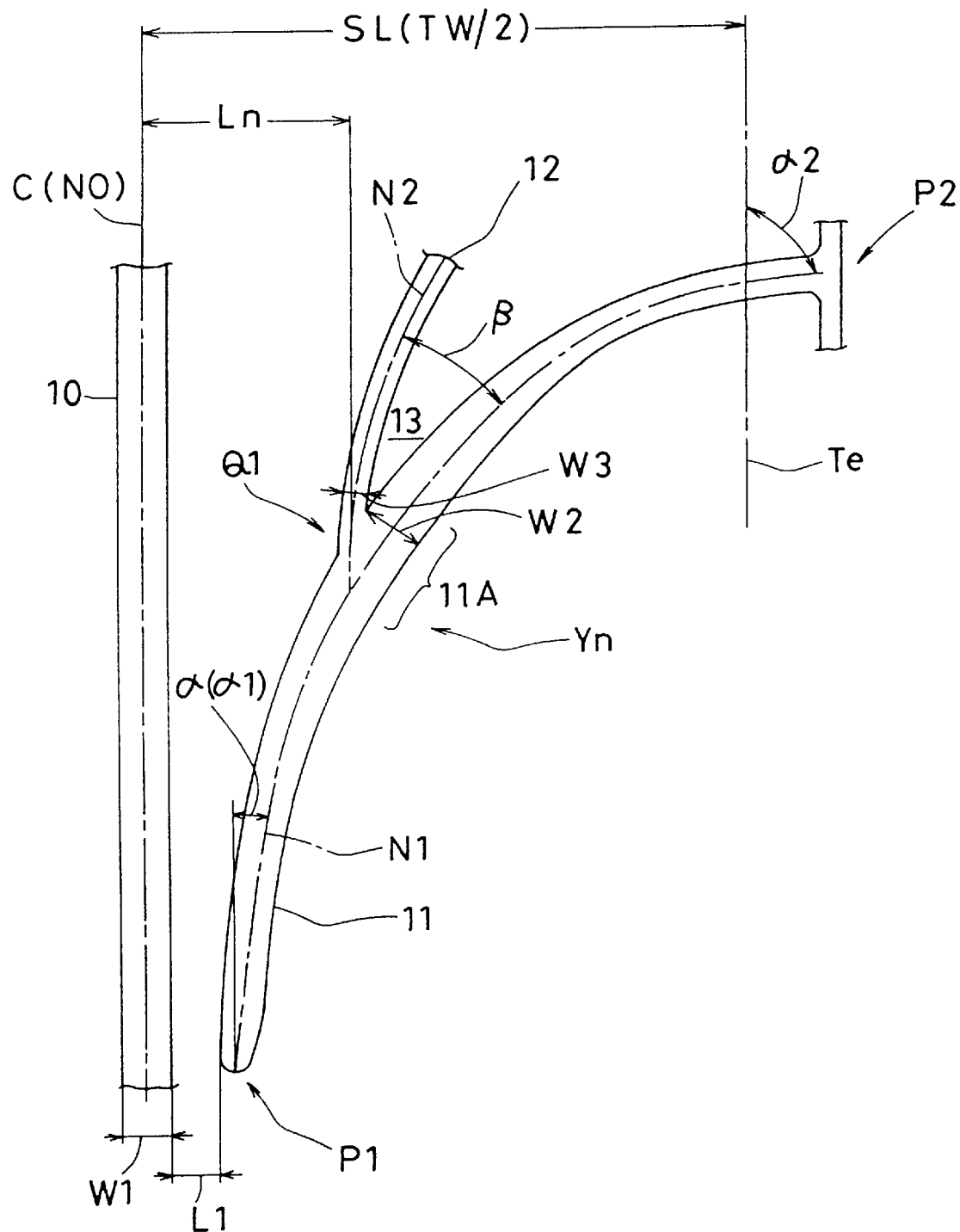
FIG. 3 is an enlarged view showing an main groove and an auxiliary groove.
Figure 4:
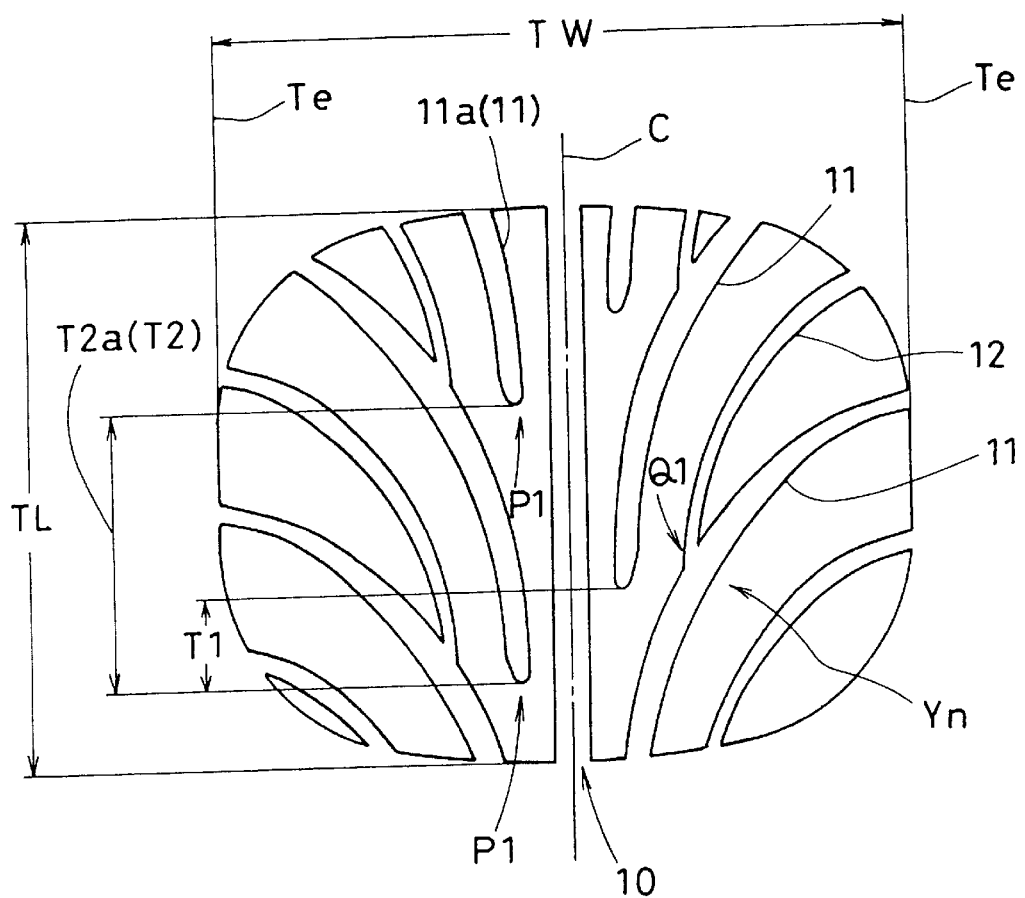
FIG. 4 is a diagram showing a foot print thereof.
Figure 5:
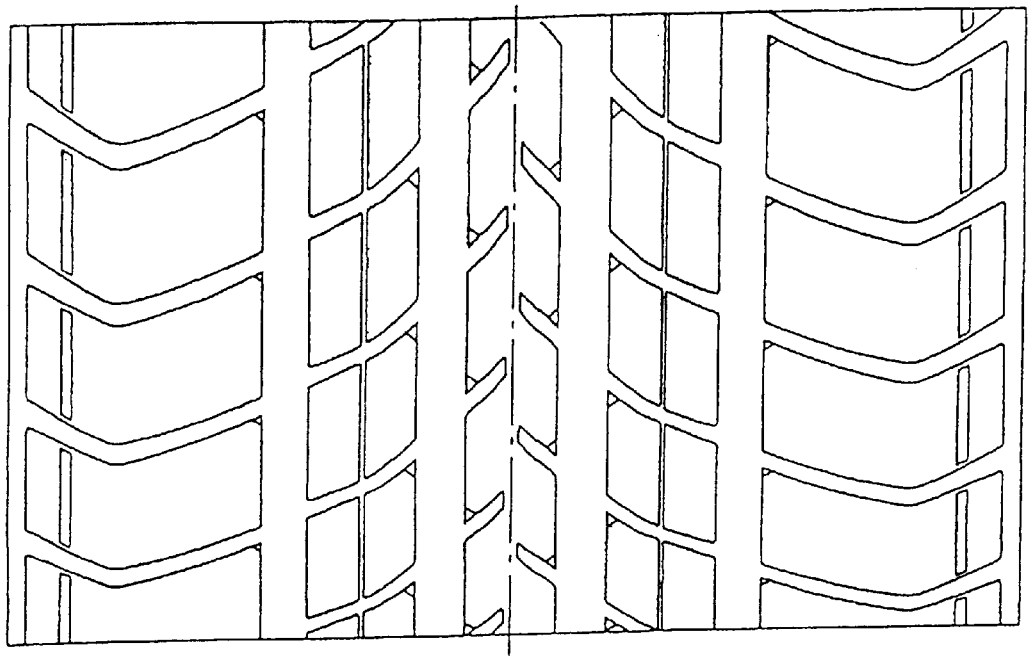
FIG. 5 is a developed partial plan view of a conventional tire.

The inclination of each of the main grooves 11 gradually increases from the axially inner end P1 to the outer end P2 so as to curve gently. Thus, the angle a with respect to the circumferential direction, of the groove center line Ni is also increased, and as shown in FIG. 3, the angle a1 at the inner end P1 is set in the range of from 0 to 15 degrees and the angle $\alpha 2$ at the tread edge Te is set in the range of from 60 to 90 degrees.

The curvature of the center line N1 may have a single radius, but in this example, in order to effectively decrease the resistance to water flow and thereby further improve the drainage, a multi-rudius such that the line Ni has no straight part is employed. In this case, it is preferable that the radius is decreased towards the axially outside.

The width of the main grooves 11 first increases gradually from the inner end P1 towards the outer end P2, but decreases near the tread edges Te to stop a noise so called pumping noise. As a result, a widest part 11A is formed in the middle Yn of the groove length as shown in FIG. 3. In this embodiment, the groove width gradually decreases from the middle yn to the tread edge.

To make up a possible decrease in drainage due to the decreased width or further improve the drainage, relatively-narrow-width auxiliary grooves 12 are disposed one between the circumferentially adjacent main grooves 11.

Each of the auxiliary grooves 12 extends from the widest part 11A of one of the main grooves 11 towards the above-mentioned reverse direction to the designed tire rolling direction F beyond the tread edge Te, with inclining axially outwards. The inclination angle of the groove center line N2 thereof with respect to the tire circumferential direction gradually increases from the axial inner end Q1 to the outer end or tread edge so that the auxiliary grooves 12 are curved in a similar fashion to the main grooves 11. In order to even the tread pattern rigidity, each auxiliary groove 12 is provided with a part 12A equidistant from the adjacent main grooves 11, and this parallel part 12A is more than 30% of the length K of the auxiliary groove 12 from the inner end Q1 to the tread edge Te. The parallel part 12 usually starts from the tread edge.

The intersecting angle β of the auxiliary groove 12 with the main groove 11 or the angle between the center lines N1 and N2 of these grooves at the inner end Q1 is preferable set in the rage of from 20 to 60 degrees, preferably 30 to 50 degrees, more preferably 35 to 40 degrees. If more than 60 degrees, the flow of water from the main groove to the auxiliary groove lessens, and further the pumping sound is liable to occur at the junction. If less than 20 degrees, the corners 13 between the main grooves 11 and auxiliary grooves 12 are liable to wear and tear.

In this embodiment, to prevent the corners 13 from being damaged, the auxiliary grooves 12 are gradually decreased in width, with approaching the inner ends Q1.

The junction of the auxiliary groove 12 and the main groove 11 is spaced apart from the center line N0 of the circumferential groove 10 by a distance Ln which is in the range of from 20 to 60%, preferably 30 to 50% of the distance SL between the center line N0 and the tread edge Te. If more than 60%, the drainage can not be effectively improved. If less than 20%, it becomes difficult to set the angle β in the above-mentioned range.

The pitches T2 of the main grooves 11, defined as the circumferential distances between the corresponding inner ends P1, are preferably in the range of from 30 to 70%, more preferably 40 to 60% of the tread length TL, whereby the pattern rigidity and drainage are improved. If less than 30%, the tread rigidity greatly decreases in the vicinity of the tire equator C. If more than 70%, the drainage becomes insufficient. The pitches T2 may be a constant value, but preferably several different values are used therefor to reduce the pattern noise. Further, between the right side and left side of the tire equator C the tread pattern is circumferentially shifted by 20 to 50% of the average T2a of the pitches T2, thereby decreasing the pattern noise.

In case of passenger radial tires, the above-mentioned tread grooves 10, 11 and 12 usually have the same depth in the range of from 6.0 to 9.0 mm, and the widths thereof are varied from 3.0 to 12.0 mm.

The above-explained tread pattern is suitably combined with a tire aspect ratio of not more than 50%.

Comparison Tests

Test tires having the structure shown in FIG. 1 and specifications given in Table 1 were made by way of test and tested for the steering stability, aquaplane, noise, and wear resistance. The tests were carried out, using a 3000 cc FR sports car, as follows. (Tire size: 235/45ZR17. Rim size: 17X8JJ, Inner pressure: front=2.3, rear=2.5 kgf/sq.cm)

Steering stability test: On a dry asphalt test course, steering stability (response, rigidity, grip, etc.) was evaluated by the test driver's feelings. The results are indicated in table 1 by an index based on the conventional tire being 100, wherein the larger the index, the better the performance.

Aquaplaning test (Straight running): On a straight wet asphalt test course provided with a 10 mm deep water pool, a wheel lock brake was applied to all the tires at running speeds of 60 km/h, 80 km/h and 100 km/h, and the running speed corresponding to the deceleration of 0.15 G was measured. The obtained speeds are indicated in table 1 by an index based on the conventional tire being 100, wherein the larger the value, the better the performance.

Aquaplaning test (Cornering): On a 100 m radius asphalt test course provided with a 5 mm deep 20 m long water pool, the speed for entering the water pool was increased in steps and the lateral acceleration was measured on the front tire to obtain the average from 50 to 80 km/h. The results are indicated in table 1 by an index based on the conventional tire being 100, wherein the larger the value, the better the performance.

Noise test: On a smooth asphalt paved road surface, the pattern noise heard in the test car in a wide speed rage of from 20 to 140 km/h was evaluated by the test driver's feelings. The results are indicated in table 1 by an index based on the conventional tire being 100, wherein the larger the index, the smaller the noise.

Wear resistance test: After running a test circuit course the tread rubber wear was measured. The results are indicated in table 1 by an index based on the conventional tire being 100, wherein the larger the index, the smaller the wear.

TABLE 1

| Tire | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| β (deg) | 20 | 35 | 40 | 60 | 35 | 35 | 35 | 35 | 35 | 35 | 35 |
| L1 | 15 | 15 | 15 | 15 | 5 | 30 | 15 | 15 | 15 | 15 | 15 |
| Ln/SL | 0.35 | 0.35 | 0.35 | 0.35 | 0.35 | 0.35 | 0.2 | 0.3 | 0.5 | 0.6 | 0.35 |
| T2/TL | 0.4 | 0.4 | 0.4 | 0.4 | 0.4 | 0.4 | 0.4 | 0.4 | 0.4 | 0.4 | 0.3 |
| T1/T2 | 0.3 | 0.3 | 0.3 | 0.3 | 0.3 | 0.3 | 0.3 | 0.3 | 0.3 | 0.3 | 0.3 |
| Steering stability | 105 | 105 | 110 | 110 | 95 | 105 | 100 | 110 | 110 | 115 | 95 |
| Aquaplane | | | | | | | | | | | |
| (straight) | 95 | 110 | 110 | 95 | 115 | 100 | 105 | 110 | 110 | 100 | 115 |
| (cornering) | 100 | 115 | 115 | 105 | 110 | 100 | 100 | 110 | 105 | 100 | 110 |
| Noise | 105 | 110 | 105 | 95 | 115 | 105 | 105 | 110 | 110 | 95 | 105 |
| Wear | 95 | 105 | 110 | 115 | 100 | 105 | 95 | 105 | 110 | 115 | 95 |

| Tire | Ex. 12 | Ex. 13 | Ex. 14 | Ex. 15 | Conv. | Ref. 1 | Ref. 2 | Ref. 3 | Ref. 4 | Ref. 5 | Ref. 6 |
|---|---|---|---|---|---|---|---|---|---|---|---|
| β (deg) | 35 | 35 | 35 | 35 | — | 10 | 70 | 35 | 35 | 35 | 35 |
| L1 | 15 | 15 | 15 | 15 | — | 15 | 15 | 40 | 15 | 15 | 15 |
| Ln/SL | 0.35 | 0.35 | 0.35 | 0.35 | — | 0.35 | 0.35 | 0.35 | 0.7 | 0.35 | 0.35 |
| T2/TL | 0.6 | 0.7 | 0.4 | 0.4 | — | 0.4 | 0.4 | 0.4 | 0.4 | 0.2 | 0.8 |
| T1/T2 | 0.3 | 0.3 | 0.2 | 0.5 | — | 0.3 | 0.3 | 0.3 | 0.3 | 0.3 | 0.3 |
| Steering stability | 110 | 105 | 110 | 115 | 100 | 100 | 105 | 105 | 100 | 90 | 105 |
| Aquaplane | | | | | | | | | | | |
| (straight) | 105 | 95 | 105 | 110 | 100 | 92 | 100 | 85 | 90 | 100 | 85 |
| (cornering) | 100 | 95 | 110 | 110 | 100 | 105 | 90 | 90 | 90 | 100 | 85 |
| Noise | 110 | 100 | 100 | 110 | 100 | 105 | 105 | 105 | 105 | 100 | 110 |
| Wear | 110 | 115 | 110 | 110 | 100 | 85 | 100 | 105 | 105 | 102 | 105 |

| Common Data | |
|---|---|
| SL (mm) | 101.25 |
| TL (mm) | 202.5 |
| Circumferential groove Width W1 (mm) | 8 |
| Main grooves | |
| Maximum width W2 (mm) | 10 |
| Minimum width W3 (mm) | 4 |
| α1 (deg) | 3 |
| α2 (deg) | 85 |

What is claimed is:

1. A pneumatic tire comprising
a tread portion defining a tread having axial edges,
at least one circumferential groove disposed in an axial center region of the tread portion,
circumferentially spaced main grooves disposed on both sides of the tire equator,
the main grooves extending axially outwardly beyond the tread edges, while inclining to one direction and increasing the inclination angle of the main groove center line with respect to the circumferential direction such that
an inclination angle α1 at an axially inner end of the main groove is 0 to 15 degrees, and
an inclination angle α2 at the tread edge is 60 to 90 degrees,
auxiliary grooves each disposed between the circumferentially adjacent main grooves and extending from a middle portion of one of said main grooves towards said one direction and extending beyond the tread edge so as to form a junction of the auxiliary groove with the main groove at an axially inner end of the auxiliary groove at said middle portion,
each said main groove having a single branch which is one of said auxiliary grooves and not communicating with said at least one circumferential groove,
the width of each said main groove gradually increasing from the inner end thereof and also from the tread edge so as to form a widened part in said middle portion,
at each said junction, said auxiliary grooves being narrower in width than said main grooves, and the width of each said auxiliary groove gradually decreasing towards the axially inner end.

2. The pneumatic tire according to claim 1, wherein the junction of each said auxiliary groove with the main groove is spaced apart from the center line of the circumferential groove by an axial distance of from 20 to 60% of an axial distance SL between one of the tread edges and said center line.

3. The pneumatic tire according to claim 2, wherein each said main groove has a widest part only in said middle portion.

4. The pneumatic tire according to claim 2, wherein an intersecting angle β of the auxiliary grooves with the main grooves is in the range of from 20 to 60 degrees.

5. The pneumatic tire according to claim 2, wherein each said auxiliary groove is provided with a part equidistant from the adjacent main grooves, and this part is more than 30% of the length of the auxiliary groove measured from the axially inner end of the auxiliary groove to the tread edge.

6. The pneumatic tire according to claim 1, wherein each said main groove has a widest part only in said middle portion.

7. The pneumatic tire according to claim 6, wherein an intersecting angle β of the auxiliary grooves with the main grooves is in the range of from 20 to 60 degrees.

8. The pneumatic tire according to claim 6, wherein each said auxiliary groove is provided with a part equidistant from the adjacent main grooves, and this part is more than 30% of the length of the auxiliary groove measured from the axially inner end of the auxiliary groove to the tread edge.

9. The pneumatic tire according to claim 1, wherein an intersecting angle β of the auxiliary grooves with the main grooves is in the range of from 20 to 60 degrees.

10. The pneumatic tire according to claim 9, wherein each said auxiliary groove is provided with a part equidistant from the adjacent main grooves, and this part is more than 30% of the length of the auxiliary groove measured from the axially inner end of the auxiliary groove to the tread edge.

11. The pneumatic tire according to claim 1, wherein each said auxiliary groove is provided with a part equidistant from the adjacent main grooves, and this part is more than 30% of the length of the auxiliary groove measured from the axially inner end of the auxiliary groove to the tread edge.

12. The pneumatic tire according to claim 1, wherein said main groove center line has a curvature of a multi-radius decreasing axially outwards.

13. The pneumatic tire according to claim 1, wherein said main groove center line has a curvature having no straight part.

14. The pneumatic tire according to claim 1, wherein said main groove center line has a curvature of a single radius.

* * * * *